GEISS, BROSIUS & PENN.
Harvester Cutter.

No. 35,815. Patented July 8, 1862.

Witnesses:

Inventors:

UNITED STATES PATENT OFFICE.

J. GEISS, J. BROSIUS, AND W. P. PENN, OF BELLEVILLE, ILLINOIS.

IMPROVEMENT IN HARVESTERS.

Specification forming part of Letters Patent No. 35,815, dated July 8, 1862.

*To all whom it may concern:*

Be it known that we, JACOB GEISS, JACOB BROSIUS, and WARDEN P. PENN, of Belleville, in the county of St. Clair and State of Illinois, have invented certain new and useful Improvements in Reaping and Mowing Machines; and we do hereby declare the following to be a full, clear, and exact description of the same, reference being had to the annexed drawings, making part of this specification.

Figure 1:
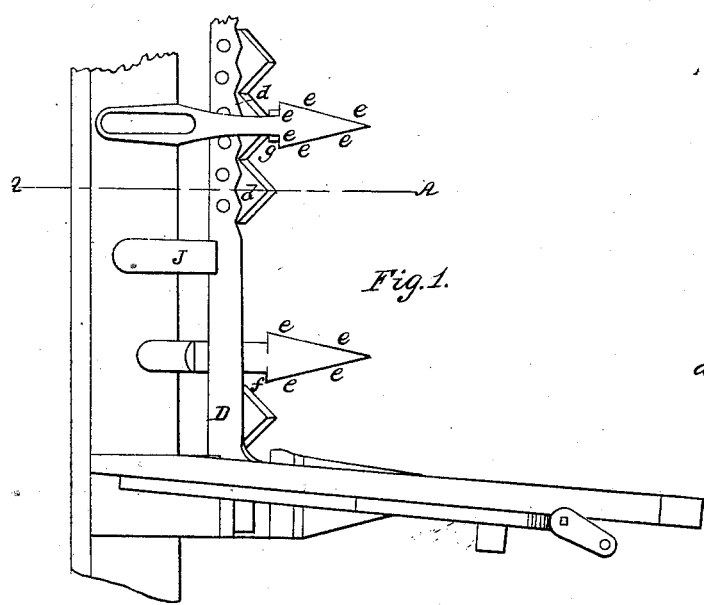
Figure 3:
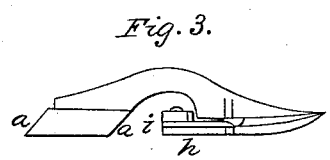
Figure 2:
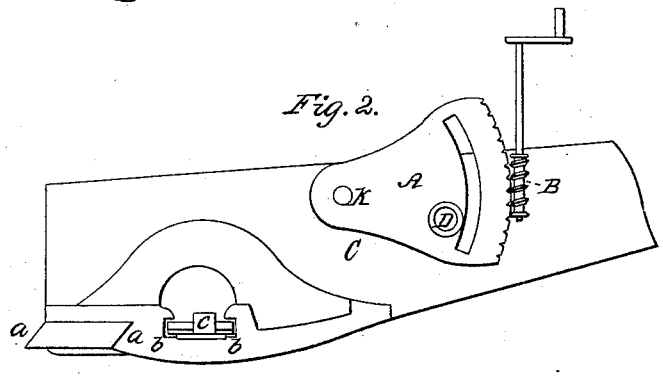

Figure 1 is a top view of our said improvements; Fig. 2, a side elevation thereof; and Fig. 3 is a transverse section taken on the lines A of Fig. 1.

Our improvements relate to the finger-bar, the guard-finger, and to the manner of raising and lowering these parts.

First, as to the finger-bar. Our improvement upon this device consists in making it flat and sloping its edges from the bottom upward and forward in the manner shown by *a a,* the object of which is to facilitate its forward motion and the departure of the cut grass from off the back edge as the bar advances.

The sickle-bar we strengthen at the end where it connects with the connecting-rod by carrying the sections of the sickle in blank under the bar to its extreme connecting end, as shown by *b,* the connecting-journal being shown by *c.* By this means the bar is stiffened where the greatest strain comes, and its durability is increased by reason of the steel coating on the bottom side formed by the blank sickle; and our improvement upon the sickle-bar further consists in making its front end zigzag, as shown by *d,* the object of which is to clear the trash out of the guard-fingers.

The guard-finger we make of the form of a triangle; on the cutting plane of the sickle, the base of said angle to be bent a little, if any, behind the points of the scalloped sickle. *e e e* show the outlines of this angle. At the base of this angle, where the neck of the finger joins it, a square shoulder is made, as at *f,* or a double shoulder, as at *g.* The object we have in making the finger in this shape is to enable us to cut the tough dry grass, which the sickle does by catching it in the angles formed by the shoulders aforesaid; and we also make the said finger something in the form of a goose-neck, as shown by Fig. 3, and carry the under part thereof back for the sickle-bar to rest on, leaving it all open behind said bar. Said projection is shown by *h,* and said opening behind said bar by *i,* Fig. 3. By having the finger thus open at the rear of the sickle-bar any danger of choking no longer exists, but the finger in this case provides no means of keeping the sickle in its proper place. This want of support we supply by means of a separate device consisting of a plane shoulder made so as to slightly overlap the sickle-bar, as shown by *j.*

We raise and lower the cutting apparatus by the use of the sector A, pivoted at *k,* with spiral cogs cut in its periphery, in combination with the worm-screw B and the main frame C and main axle, which has its journal at D. There are of course two of these sectors, one for each end of the axle, and by means of them a very ready and certain means of adjustment is afforded the attendant.

Having now described our improvements in reaping and mowing machines, we claim as our invention and desire to secure by Letters Patent—

1. Making the finger-bar flat and sloping the front and rear edges thereof backward and downward, so as to give the cross-section of the bar a rhomboidal form, as represented by Fig. 3.

2. The shoulder-piece J, in combination with the finger shown in Fig. 3, when said finger is made open on the under side thereof, so as to leave an open space at the rear of the sickle-bar under the fingers, in the manner shown and described.

3. We do not claim the use of a screw-sector for raising and lowering the frame and cutting apparatus; but what we claim is the screw B, the sector A, the main shaft D, and the main frame *c,* when these several parts are constructed and arranged in relation to each other as set forth.

JACOB GEISS.
JACOB BROSIUS.
W. P. PENN.

Witnesses:
FRANCIS D. BELCOUR,
AMOS BROADNAX.